No. 808,412. PATENTED DEC. 26, 1905.
S. WARD.
EYEGLASSES.
APPLICATION FILED JUNE 3, 1905.
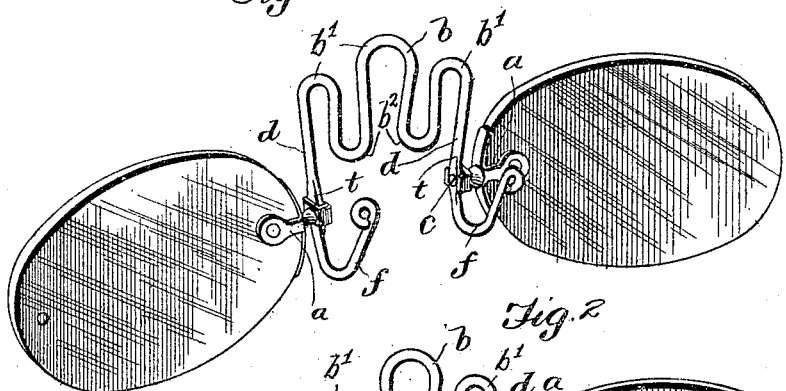
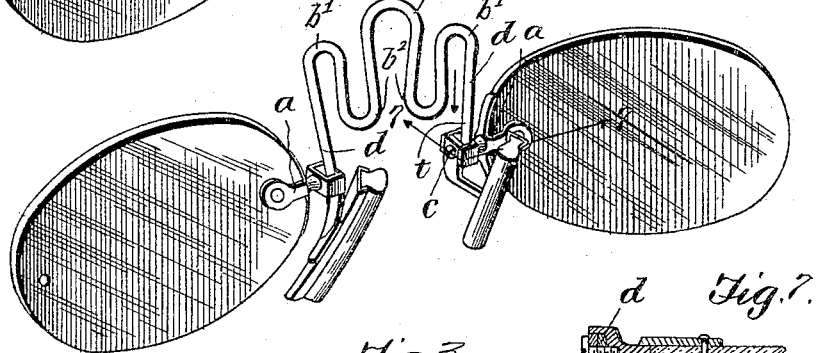
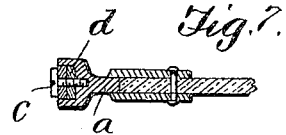
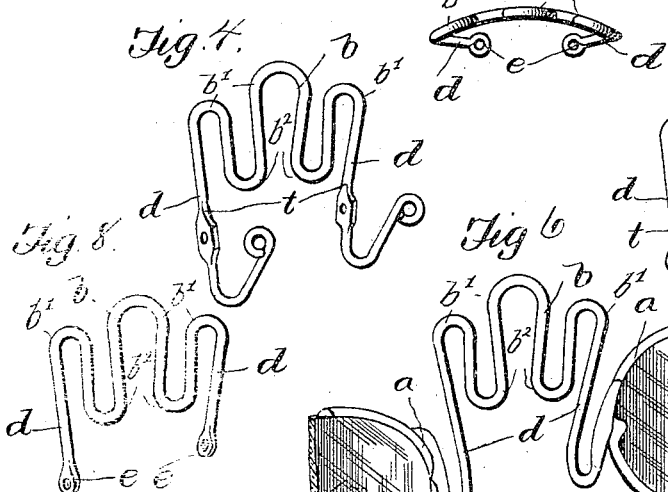
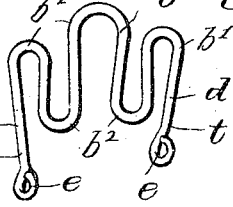
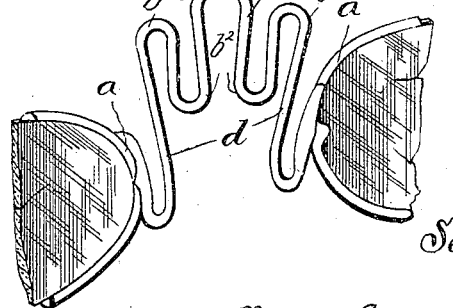
Witnesses
Robt. A. Boswell
George M. Andrews
Inventor
Samuel Ward
By E. W. Anderson
his Attorney

UNITED STATES PATENT OFFICE.

SAMUEL WARD, OF NEW BEDFORD, MASSACHUSETTS.

EYEGLASSES.

No. 808,412.  Specification of Letters Patent.  Patented Dec. 26, 1905.

Application filed June 3, 1905. Serial No. 263,633.

*To all whom it may concern:*

Be it known that I, SAMUEL WARD, a citizen of the United States, and a resident of New Bedford, in the county of Bristol and State of Massachusetts, have made a certain new and useful Invention in Eyeglasses; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view of my invention as applied with the branches $d$ extended to form the nose-guards. Fig. 2 is a similar view showing such branches without nose-guard extensions. Fig. 3 is a detail plan view of the spring and its extensions as shown in Fig. 1. Figs. 4, 5, and 6 are detail views of different forms of springs. Fig. 7 shows a still further modified form of spring. Fig. 8 is a detail sectional view.

The invention relates to frames for eyeglasses; and it consists in the novel construction and combinations of parts, as hereinafter set forth.

In the accompanying drawings the invention is shown in its application to eyeglass-frames of the simplest character; but it can also be applied to such frames having rims for the lenses.

The invention relates, mainly, to the bridge which connects the lens portions of the frame; and its object is to provide a bridge which will not only automatically adjust itself to the nose, but will also in such adjustment tend to preserve the normal position of the lenses. To this end the bridge is made of thin spring metal in the form of a series of vertical convolutions, wherein each convolution is a spring in itself, the series being designed to provide for a comparatively direct motion of the lenses in a horizontal line with each other rather than an angular upward motion when the lenses are applied to the nose. In some forms the bridge is made a little convex toward the front, so that in the application of the glasses, whereby the bridge is widened on account of its spring character, the lenses will be thrown forward toward the same vertical plane.

In the drawings, showing a pair of eyeglasses, the letter $a$ designates the lens frame or holder, $b$ the convoluted bridge, and $c$ the small screw which is usually employed to secure the ordinary bridge to the holder. When the improved bridge is applied to a pair of eyeglasses having lens-frames, it may be made entire with such frames, if desired.

The bridge $b$, as illustrated, consists of three equalized vertical loops or convolutions $b'$, connected to form intermediate reversed loops $b^2$ above a line joining the points of attachment to the lens frames or holders, the middle loop rising a little above the lateral loops for esthetic effect and the end loops extending a little below the middle loop, so that each loop has about the same amount of spring material. The loops $b'$ have the branches thereof joined at the top, and the reversed loops $b^2$ have the branches thereof joined at the bottom. The branches of the loops lie in longitudinal planes with respect to the bridge. The end branches or arms $d$ of the bridge extend downward below the convolutions and may terminate in the form of small loops, as at $e$, to provide secure bearings for the seats in the holders, or they may be flattened or perforated or may be grooved, or these ends may be extended, as indicated at $f$, to form the guards which bear on the sides of the nose, or they may have their ends flattened or perforated for attachment to guards lined with cork, xylonite, or rubber in the ordinary manner.

The convoluted bridge is designed to be made of round, half-round, or flat spring-wire in gold, silver, steel, or other material having proper elasticity for the purpose. The convoluted bridge has usually a vertical breadth of about a third of an inch, and there being several upward and downward extending arms of the loops of about the same length between the end branches the bridge serves an important purpose in facilitating the adjustment of the glasses upon the nose on account of the purchase afforded to the fingers, and when applied the tops of the convolutions provide a bearing against the forehead, which serves as a brace or steadying-support. The loops of the convoluted bridge may be of greater number and may be varied in form without departing from their vertical and equalized character. Usually the outer branches of the bridge are inclined a little inward or toward each other to provide for some separation in the application of the bridge without destroying their general appearance. The lower portions of these branches extend nearly or quite in the vertical direction, as indicated at $t$, to facilitate their attachment to the lens holders or frames.

Having described the invention, what I claim, and desire to secure by Letters Patent, is—

1. An eyeglass-bridge of elastic character composed of vertical loops having the branches thereof joined at the top, and connected by intermediate reversed loops having the branches thereof joined at the bottom, the branches of the loops lying in longitudinal planes, said bridge having end branches extending below the loops, substantially as specified.

2. An eyeglass-frame having a spring-bridge consisting of several vertical loops having the branches thereof joined at the top, and connected by intermediate reversed loops having the branches thereof joined at the bottom, the branches of the loops lying in longitudinal planes, and being spaced apart at one end, substantially as specified.

3. An eyeglass-frame having a vertically-looped spring-bridge consisting of several loops of equalized length and breadth having the branches thereof joined at the top and connected by intermediate reversed loops having the branches thereof joined at the bottom between end attachment branches having terminal guard extensions, the branches of the loops lying in longitudinal planes, and being spaced apart at one end, substantially as specified.

4. An eyeglass-bridge of elastic character, composed of vertical loops having the branches thereof joined at the top, the branches of the loops lying in longitudinal planes and being separated from each other at the bottom, substantially as specified.

In testimony whereof I affix my signature in presence of two witnesses.

SAMUEL WARD.

Witnesses:
JAMES McDONNELL,
GEO. E. TOWNE.